United States Patent [19]
Clark et al.

[11] 3,965,984
[45] June 29, 1976

[54] WATERFLOOD METHOD USING OVERBASED NORMAL ALKYLAROMATIC SULFONATES

[75] Inventors: Charles R. Clark; M. Duane Gregory; Oliver C. Kerfoot, all of Ponca City, Okla.; Delmar D. Krehbiel, Lubbock, Tex.; Carl D. Kennedy, Ponca City, Okla.

[73] Assignee: Continental Oil Company, Ponca City, Okla.

[22] Filed: Sept. 30, 1974

[21] Appl. No.: 510,204

Related U.S. Application Data

[62] Division of Ser. No. 344,017, March 22, 1973, abandoned.

[52] U.S. Cl. .............................. 166/270; 166/274; 252/8.55 D
[51] Int. Cl.² ............................................ E21B 43/22
[58] Field of Search ................. 166/270, 273–275, 166/305 R; 252/8.55 D; 260/505 S, 505 A

[56] References Cited
UNITED STATES PATENTS

| | | | |
|---|---|---|---|
| 3,111,984 | 11/1963 | Reisberg | 166/270 |
| 3,302,711 | 2/1967 | Dilgren | 166/270 |
| 3,302,713 | 2/1967 | Ahearn et al. | 166/275 X |
| 3,316,294 | 4/1967 | Feighner et al. | 260/505 |
| 3,330,347 | 7/1967 | Brown et al. | 166/270 |
| 3,348,611 | 10/1967 | Reisberg | 166/275 |
| 3,804,170 | 4/1974 | Krehbiel et al. | 166/270 |
| 3,804,171 | 4/1974 | Krehbiel et al. | 166/270 |
| 3,865,735 | 2/1975 | Clark et al. | 166/275 X |

*Primary Examiner*—Stephen J. Novosad
*Attorney, Agent, or Firm*—F. Lindsey Scott

[57] ABSTRACT

An improved anionic waterflood additive is prepared by partially chlorinating a normal alkane having about 10 to about 18 carbon atoms to about 2 to about 15 weight percent chlorine content, employing the chlorinated alkane to alkylate an aromatic hydrocarbon, such as benzene; sulfonating the thus formed alkylate or a fraction thereof to form a sulfonic acid; converting the sulfonic acid to a sulfonate by reacting with a base component, such as an alkali metal hydroxide, ammonium hydroxide, or an alkali metal carbonate; and overbasing the sulfonate by admixing with an excess of base component such that the ratio: "weight of excess base component/weight of sulfonate" is about 0.03 to about 3.0. The anionic waterflood additive is injected into a petroliferous formation, the formation is waterflooded, and oil is recovered.

14 Claims, No Drawings

WATERFLOOD METHOD USING OVERBASED NORMAL ALKYLAROMATIC SULFONATES

This division, of application Ser. No. 344,017, filed Mar. 22, 1973, now abandoned.

BACKGROUND OF THE INVENTION

1. Field of the Invention

In one aspect, this invention relates to an anionic waterflood additive.

In another aspect, this invention relates to a process for the recovery of hydrocarbons from a petroliferous formation involving injecting into the petroliferous formation an improved anionic waterflood additive plus water.

2. Brief Description of the Prior Art

A large percentage of the oil in petroliferous formations is held within the rock of the formation by the surface forces between the formation rock, the oil therein, and the aqueous liquid in the formation. As a result, a substantial portion of such oil usually remains in the rock of the formation even when wells transversing the formation are no longer productive. Various secondary recovery techniques, such as thermal recovery, gas injection, and waterflooding, have been suggested for the recovery of this fixed oil which remains in the formation after primary recovery methods are no longer feasible to produce additional oil. As a secondary recovery technique, water-flooding is quite commonly employed, and a multiplicity of methods have been suggested for improving the efficiency and economy of oil recovery by the practice of waterflooding. Such methods frequently include incorporation of a water-soluble surfactant in the waterflood liquid, which is injected into the petroliferous formation. A number of typical surfactants have been proposed for this purpose, including alkyl pyridinium salts, sodium lauryl sulfate, certain sulfonates, glycosides, sodium oleates, quaternary ammonium salts, and the like. The use of such surfactants has arisen because it is widely recognized that a low interfacial tension between the surfactant floodwater and the reservoir crude oil is beneficial to the improvement of recovery efficiencies and feasibilities.

Recently it has been proposed that nonionic surfactant solutions, such as a polyoxyethylene-polyoxypropylene copolymer containing solution be injected into the formation through a first of a series of two well bores to thereby displace the hydrocarbons in the formation toward a second well bore. The nonionic surfactant flood is then followed by an injection of a slug of aqueous caustic mixture into the formation through the first well bore to displace the hydrocarbon of the formation and the injected surfactant toward the second well bore. The caustic slug has a basicity of at least 1.5 pH levels greater than that of the native formation waters. However, the use of a nonionic surfactant has not fully met the needs of the industry for a desirable waterflood surfactant composition, and new compositions are constantly being sought which will allow recovery of the residual oil remaining in the formation following primary oil recovery operations. Also, the surfactant materials of the prior art have on occasions suffered from lack of availability or from non-feasibility due to excessive costs and thus have not entirely satisfied the long-felt need of the industry for a feasible method to recover oil remaining in subterranean petroliferous formations.

OBJECTS OF THE INVENTION

An object of the invention is to provide an improved waterflood additive and a method of using the waterflood additive in the recovery of secondary hydrocarbons from petroliferous formations.

These and other objects, advantages, and features of this invention will become apparent to those skilled in the art from a reading of the following detailed description and claims.

SUMMARY OF THE INVENTION

According to the present invention, we have now found an improved anionic waterflood additive which comprises an overbased sulfonate derived from an alkylate product which in turn is derived from a partially chlorinated normal alkane product wherein the degree of chlorination is about 2 to about 15 weight percent and an aromatic hydrocarbon.

Further, according to the invention, we have found that injection of the improved anionic waterflood additive plus water into a petroliferous formation results in recovery of substantial yields of hydrocarbons therefrom.

One method of employing the anionic waterflood additive of the instant invention includes a first step of injecting a slug of an aqueous mixture containing about 0.5 to about 25 weight percent of the overbased sulfonate into the formation through an injection well and thence recovering displaced hydrocarbons from the formation through a production well. Additional hydrocarbons can be recovered, if desired, by injecting an effective amount of an aqueous slug of base component into the petroliferous formation after the overbased sulfonate slug has been injected.

Another method of recovering the hydrocarbons from a petroliferous formation involves injecting a first slug of an aqueous mixture containing about 0.5 to 25 weight percent of the sulfonate derived from the alkylate product into the petroliferous formation followed by an amount of an aqueous base component containing mixture sufficient to overbase the sulfonate such that the overbased sulfonate is formed in situ by contacting of the aqueous sulfonate containing slug and the aqueous base component containing slug.

DESCRIPTION OF THE PREFERRED EMBODIMENTS

The instant invention relates to an improved anionic waterflood additive. The waterflood additive is prepared by partially chlorinating a normal alkane having about 10 to about 18 carbon atoms to about 2 to about 15 weight percent chlorine content, employing the chlorinated alkanes to alkylate an aromatic hydrocarbon; sulfonating the thus formed alkylate or a fraction thereof, to form a sulfonic acid; converting the sulfonic acid to a sulfonate by reacting with a base component; and overbasing the sulfonate by admixing therewith an excess of base component so that the ratio: weight of excess base component/weight of sulfonate is about 0.03 to about 3.0.

The instant invention also relates to injecting the improved anionic waterflood additive with water into a petroliferous formation to promote the recovery of oil from the formation.

The normal alkane which is chlorinated has about 10 to about 18 carbon atoms per molecule. Examples of such alkanes include decane, octadecane, hexadecane, dodecane, and the like. Mixtures can be employed.

Suitable normal alkanes which can be employed can be readily derived by several well-known processes. Two of such well-known processes are the molecular sieve process and the urea addition process for recovery of such alkanes from petroleum-derived streams, such as kerosene streams.

The molecular sieve method for the recovery of normal alkanes from hydrocarbon mixtures containing such alkanes involves contacting a zeolitic molecular sieve with a suitable hydrocarbon mixture, such as kerosene, at a temperature of about 200°F to about 500°F and at a pressure of about 200 psig to about 1,000 psig. The zeolitic molecular sieve can be continuously contacted with the hydrocarbon feed stream until the effluent leaving and the solution containing the molecular sieve begins to evidence an increased amount of alkane content. When the absorption medium, such as the zeolitic molecular sieve, is saturated with absorbed alkanes, as indicated by an increased content of normal alkanes in the effluent, the alkanes are desorbed from the sorbant and recovered.

The urea adduction method provides an alternate method for the recovery of suitable normal alkanes. The urea adduction process involves crystallizing urea in the presence of a mixture of hydrocarbons containing the normal alkanes to be separated. The normal alkanes are selectively absorbed by formation of a relatively stable crystalline complex with urea which is separable by filtration. In the formation of the complex, the urea molecules can be visualized to wrap around the straight chain molecules of the normal alkanes in a hexagonal spiral, the spirals forming channels sufficiently large to accommodate the straight chain normal alkanes but not branched alkanes or cyclic hydrocarbons.

The quantity of urea required for the formation of an adduct with a normal alkane is about 3.5 parts of urea per part of normal alkane desired to be adducted. Larger or even somewhat smaller amounts of the urea in relation to the normal alkane can be employed, but it is preferred to employ approximately the numerical ratio stated. The use of an activator in conjunction with the urea is desirable.

The process for effecting a separation of the normal alkanes by the urea adduction method comprises adding the hydrocarbon feedstock which contains suitable normal alkanes to a solution of urea and an activator while constantly stirring the mixture. The time in which the complexes are formed is relatively short; that is, usually about an hour and generally not in excess of about two hours. Once complexing has occurred, the mixture is filtered and then washed with a suitable hydrocarbon solvent, such as butane, pentane, hexane, or the like. The washed crystals are then suitably decomposed, as in hot water, to yield the adducted normal alkanes. It is preferred to carry out the decomposition of the adduct at a temperature in the range of about 80° to about 90°C. Operation at an elevated temperature of this magnitude permits flashing off of any residual hydrocarbon solvent retained by the complex crystal. Multiple adduction procedures can be employed, and a multiple-stage adduction process is often more efficient than a one-stage process.

Suitable normal alkane products can be obtained by other processes or can be obtained commercially. It is only critical that the material be substantially composed of normal alkanes having about 10 to about 18 carbon atoms per molecule.

The partially chlorinated alkane which is employed can be readily prepared by chlorinating the normal alkane by any suitable method known to the art to chlorinate such normal alkanes. Liquid or vapor phase chlorination procedures can be employed. The amount of chlorine in the chlorination product must, however, be within the range of about 2 to about 15 percent based upon the weight of the chlorine and the total weight of the chlorinated alkane product including unreacted alkane. It is presently preferred that the chlorinated derivatives contain about 3 to about 6 weight percent chlorine.

The chlorine content of the partially chlorinated alkane derivative can readily be determined by conventional chemical analyses. It is well within the skill of those skilled in the art to produce a chlorinated alkane derivative having the degree of chlorination desired. The chlorinated alkanes are essentially comprised of largely mono plus some polychloroalkanes. The total product also contains unreacted normal alkanes.

To produce the alkylate of this invention, the chlorinated alkanes are employed to alkylate an aromatic hydrocarbon. The alkylation is conducted in the presence of a suitable Friedel-Crafts catalyst. The Friedal-Crafts catalysts are a group well known to those skilled in the art. Presently, it is particularly preferred that aluminum chloride be employed as a catalyst for the alkylation reaction. Such alkylation reactions and catalysis thereof, as well as the conditions under which such are run, are well known to those skilled in the art.

The aromatic hydrocarbon that is alkylated with the chlorinated alkane can be represented as follows:

wherein Ar is a benzene or naphthalene ring having a valence of n; wherein R' is methyl or ethyl; and wherein n is 0, 1, or 2. Some examples of suitable aromatic hydrocarbons include benzene, naphthalene, toluene, xylenes, ethyl benzene, diethyl benzenes, diethyl naphthalenes, and the like.

The alkylation reaction temperature to produce the alkylates can vary considerably, ranging from about 25°C to about 80°C. A temperature range which is particularly suitable is about 40° to about 50°C.

The ratio of aromatic hydrocarbon to chlorinated normal alkane can be varied over a wide limit. For example, ratios such as about 1 to about 25 moles of the aromatic hydrocarbon per mole of chloroalkane can be employed. Ratios of about 5:1 to about 10:1 are particularly desirable.

The amount of alkylating catalyst, such as aluminum chloride, which is employed for effecting alkylation, can conveniently be based upon the weight of the chlorinated alkane derivative present in the reaction environment. On this basis, about 1 to about 10 percent by weight of aluminum chloride or other Friedel-Crafts catalyst is suitable. The use of aluminum chloride sludge for recycle is advantageous to the process. By recycling the sludge, less fresh aluminum chloride needs to be added to the reaction environment. This results in considerable savings. Also, better product yields are obtained since less of the reactants and products are complexed with the catalyst and lost thereby. Recycle sludge can amount to about 10 to about 100 weight percent or more of the chlorinated alkane charge. Preferably, about 50 to about 100 weight percent of recycle sludge is charged based upon the weight of the chlorinated alkane derivative charged.

The alkylation can be effected in a continuous or batch-wise manner. Effective contact time between the catalyzed reactants is desirably about 10 to about 60 minutes. The precise time needed for effecting alkylation is dependent upon a number of factors, including the amount of catalyst used, the ratio of aromatic hydrocarbon to chlorinated alkane derivatives employed, the temperature, and the like. Those skilled in the alkylation art can readily optimize such parameters.

The alkylation reaction product is charged to a separator where the catalyst sludge is removed upon completion of the desired degree of alkylation. When the sludge has been removed, the alkylate is washed. Thereafter, the alkylate product can be sulfonated per se or can be subjected to fractional distillation to recover particularly desired fractions which are then subjected to sulfonation.

According to one presently preferred embodiment, the alkylate product is subjected to fractional distillation to remove the monoalkylate product and other similar molecular weight species from the desired high molecular weight products, that is, the bottoms fraction. The temperature at which such fractional distillation cuts are made will vary somewhat depending upon the particular aromatic hydrocarbon and upon the particular chlorinated normal alkane employed for the alkylation reaction. However, where the aromatic hydrocarbon is benzene, the distillation cut will generally be within the range of about 180°C to about 240°C at 10 millimeters mercury pressure, depending largely upon the length of the alkyl constituent of the alkylate. Thus, when the alkyl component of the alkylate is derived from a mixture of $C_{10}$ to $C_{12}$ normal alkanes, the fractionation of the alkylate is carried out to a temperature of about 200°C at 10 millimeters mercury pressure. On the other hand, when the alkyl component of the alkylate is derived from the mixture of $C_{12}$ to $C_{14}$ normal alkanes, the fractionation is carried out at a temperature of about 210°C to about 215°C at 10 millimeters mercury pressure. Thus, alkylates having an alkyl component have a greater molecular weight require increased temperatures at which the fractionation cut is taken to provide the desirable bottoms fraction.

According to another presently preferred embodiment, the separated distillate fraction of the alkylate product, that is, the monoalkyl aromatic hydrocarbon and similar molecular weight species, is recycled to the alkylation reaction when the process is done in a continuous manner, or is recycled to a subsequent batch when the alkylation reaction is done in a batch-wise manner. In this way, the monoalkyl aromatic compounds formed in the alkylation reaction are converted to the more desired higher molecular weight alkylate products.

According to yet another presently preferred embodiment, the alkylate is subjected to fractional distillation to recover a fraction having a boiling range of about 180°C to about 280°C at 10 mm Hg pressure.

Once the alkylation conversion has been carried out and the desired alkylate products recovered, the alkylate products are sulfonated to form a sulfonic acid. As pointed out heretofore, the alkylate product which is sulfonated can be either the total alkylate product formed in the above-noted alkylation reaction, can be an alkylate bottoms product formed by taking fractional distillation cuts, can be certain distillation cuts of the bottoms product, can be an alkylate bottoms product wherein recycle of monoalkyl aromatic hydrocarbons is practiced, can be fractions of the residue left when the monoalkyl aromatic compounds and similar molecular weight materials are distilled from the total alkylate product, or can be mixtures of such alkylate products. Also, certain other high molecular weight alkylatable hydrocarbons can be admixed with such alkylate products if desired.

The sulfonation conversion of the alkylate product to the sulfonic acid derivative thereof can be by any procedures heretofore known to the art for the sulfonation of a sulfonatable hydrocarbon. A number of sulfonation procedures are known in the art wherein $SO_3$, sulfuric acid or oleum, mixtures of $SO_3$ and $SO_2$, or organic sulfonating agents containing $SO_3$ are employed as a sulfonating agent. Furthermore, the sulfonation can be carried out in either a batch type process or a continuous falling film reaction process. When $SO_3$ is employed as a sulfonating agent, the mole ratio of $SO_3$ to alkylate product is suitably about 1:1 to about 1.5:1. Thus, each molecule of alkylate product should have on the average about one or more sulfonic acid groups thereon following the sulfonation reaction.

The sulfonic acids formed by the sulfonation reaction are then converted to the respective sulfonates by reacting with a base component. The conversion to the sulfonates is readily effected by simply admixing the base component with the sulfonic acids. This can be accomplished by any means known to the art for the conversion of sulfonic acids to sulfonates. Such procedures are well known to those skilled in the art.

The base component employed in this invention is selected from the alkali metal hydroxides, ammonium hydroxide, and the alkali metal carbonates. Examples of such base components include: NaOH, KOH, LiOH, $Na_2CO_3$, $NaHCO_3$, $NH_4OH$, $K_2CO_3$, and the like. Sodium hydroxide is presently particularly preferred as a base component.

The improved anionic waterflood additives of the instant invention are overbased alkylate product sulfonates, wherein the sulfonates are derived as heretofore set forth.

Other high molecular weight natural or synthetically derived sulfonates can be added to the products of this invention, if desired.

The overbased sulfonates have excess base component added beyond that needed to neutralize the sulfonic acid precursors to the sulfonates such that the ratio: weight of excess base component/weight of sulfonate is about 0.03 to about 3.0. Overbased sulfonates wherein the ratio is about 0.20 to about 1.0 are presently particularly preferred.

Thus, when the sulfonates are merely neutralized and injected as an aqueous mixture of the neutralized product into the petroliferous formation, a sufficient amount of the aqueous base component must be added in a second slug to insure that the waterflood additive composition formed in situ in the formation is overbased and is in the prescribed ranges.

In describing the use of the anionic waterflood additives of the instant invention, two methods of injecting the additives into a petroliferous formation will be discussed. However, it should be understood that neither method is presently particularly preferred over the other and that the particular method which is chosen for a particular application will depend to a large extent upon the facilities available at the well site.

One method of employing the anionic waterflood additives of the instant invention involves injecting an aqueous slug containing about 0.5 to about 25 weight percent of the alkylate product sulfonate through a well bore into a petroliferous subterranean formation from which additional hydrocarbon is to be recovered. After the sulfonate slug has been dispersed into the formation, an effective amount of an aqueous base component mixture in the form of a second slug is introduced into the formation to form an aqueous mixture in situ in the subterranean formation containing about 0.5 to about 25 weight percent of the overbased waterflood additive composition. When employing such a method, a sufficient amount of the base component containing mixture must be injected into the formation to assure that the waterflood additive will be overbased such that the ratio is about 0.03 to about 3.0. If sufficient base component is not added to reach the lower minimum ratio of about 0.03, desirable results are not obtained. Likewise, problems of viscosity and handling of materials are encountered when the amount of overbasing is above the upper ratio value of about 3.0.

A second system which can be employed in employing the anionic waterflood additive compositions involves producing the overbased sulfonate, admixing with water, injecting the aqueous mixture containing from about 0.5 to about 25 weight percent of the overbased alkylate product sulfonate directly into the petroliferous formation as one slug. When employing this procedure, the same limitation as to the overbasing ratio apply as to the procedure heretofore described.

While the overbased sulfonates demonstrate remarkable properties as waterflood additives in the second system described, additional tertiary oil can be recovered from the subterranean petroliferous formation by injecting an effective amount of an aqueous mixture containing a base component into the formation which has previously been contacted with the overbased sulfonate composition. The amount and concentration of the aqueous base component containing mixture employed can vary widely. However, desirable results are obtained when the concentration of the base component in the mixture is about 0.5 to about 50 percent by weight and the amount of mixture injected into the formation is about 10 to about 1,000 volume percent based on the amount of sulfonate containing slug injected into the formation.

As heretofore stated, the material injected into the petroliferous formation is an aqueous mixture containing about 0.5 to about 25 weight percent of the overbased alkylate product sulfonate waterflood additive. Particularly desirable results are obtained wherein the aqueous mixture injected into the formation contains about 3 to about 15 weight percent of the overbased sulfonate.

Difficulties are sometimes encountered in the formation of the aqueous mixture due to the solubility characteristics of the anionic waterflood composition. When such solubility problems are detected, one can add an effective amount of any suitable water-soluble solubilizing agent to promote solubility. The amount of water-soluble solubilizing agent required in such instances will vary widely but will generally be within the range of about 0.5 to about 25 weight percent based on the weight of the total composition. Examples of some suitable water-soluble solubilizing agents include aryl sulfonates such as sodium benzene sulfonate, sodium xylene sulfonates, sodium toluene sulfonates, sodium hexylbenzene sulfonates, sodium octylbenzene sulfonates, and the like; alcohol ethoxylates wherein the molecule contains about 30 to about 90 weight percent of ethylene oxide and the alcohol constituent contains about 2 to about 20 carbon atoms; lower olefin-derived sulfonates derived from alkenes such as butenes and pentenes and the like; and ethoxylated alkyl phenols, such as octyl phenol.

It is to be understood that any sulfonates added as such water-soluble solubilizing agents are not to be taken into account in determining the ratio: weight of excess base components/weight of sulfonate.

In order to more fully explain the present invention, the following examples are provided. However, it is to be understood that the examples are not intended to function as a limitation on the invention as described and claimed in the application.

EXAMPLE 1

By way of exemplifying an embodiment of the invention, a normal alkane mixture having about 10 to about 12 carbon atoms per molecule, having an average molecular weight of about 165 and having an average of about 11.6 carbon atoms per molecule is charged to a stirred reactor. The normal alkane mixture is heated to about 125°C and chlorine is added slowly over a period of about 1.5 hours. X-ray analyses of the product indicates a 4.2 percent chlorine content of the partially chlorinated alkane product.

The partially chlorinated alkane product is employed to alkylate benzene thus. The partially chlorinated alkane product plus benzene is charged to a stirred reactor in an 8:1 mole ratio of benzene to chloroalkane in the product. Temperature of the reaction mixture is maintained at about 65°C. A total of 4 weight percent based on the chloroalkane content of the product of $AlCl_3$ is added and the reaction is continued with stirring for 1.5 hours. Catalyst sludge is separated after settling, and the product is first water-washed and then is washed with dilute aqueous caustic. The excess benzene is stripped therefrom, followed by the excess unreacted n-paraffin. The resulting alkylation product is recovered.

Further according to this exemplary procedure, the alkylation product is then sulfonated by adding 125 grams of oleum per each 100 grams of alkylation product with vigorous stirring in a stirred reactor over a 30-minute period, with a temperature maintained at 40°C. The sulfonation products are post-stirred for 60 minutes at 45°C. The sulfonation products are quenched with 40 grams of water/100 grams of oleum used. Spent acid is split off and the upper layer of sulfonic acid derivative is neutralized with 15 weight percent sodium hydroxide in aqueous solution.

To further exemplify this embodiment, a series of runs are conducted to evaluate the oil recovery properties of the anionic waterflood additives of the instant invention. In each run, 12 inches × 2 inches × 2 inches Berea sandstone cores are evacuated under vacuum and then saturated with 5 weight percent sodium chloride brine. The brine saturated cores are reduced to irreducible water saturation with 80 pale oil, (a solvent refined Mid-Continent lubricating oil having a viscosity of 80 SUS at 100°F) and then waterflooded to residual oil saturation with a sodium chloride brine solution.

The waterflood additives are then injected into cores as aqueous mixtures containing sodium sulfonate and having overbasing. Tertiary waterflood is conducted at 40 cc of water/hour, a flow rate equivalent to 6–7 feet per day of reservoir flooding to determine the effectiveness of the overbased anionic waterflood additives as oil recovery agents. The oil recovery runs are conducted at 130°F.

When this exemplified procedure is carried out, substantial quantities of oil are produced by injection of the overbased anionic waterflood additive beyond the oil produced by waterflood alone.

This example typifies use of the overbased alkylaromatic sulfonates of the instant invention to promote oil recovery wherein the entire alkylation product is employed to form the overbased sulfonate.

EXAMPLE 2

A sample of NALKYLENE 500 detergent alkylate produced commercially in the Baltimore plant of Continental Oil Company, and available from Continental Oil Company was obtained. The detergent alkylate is principally a linear monoalkylbenzene containing $C_{10}$–$C_{12}$ carbon side chains and having an average molecular weight of about 273–238. The NALKYLENE 500 detergent alkylate thus obtained was manufactured according to the process described in U.S. Pat. No. 3,316,294. An exemplification of the process is found in paragraph 1 and 2 of Example 1 of the instant application, but with an added fractional distillation step to obtain a product having a carbon range and molecular weight above defined being employed.

This NALKYLENE 500 alkylate product was then sulfonated according to the procedure of Example 1. A series of runs were then conducted according to the procedure of Example 1 to evaluate the oil recovery properties. All of the oil recovery runs were conducted at 130°F. Data are presented in the following Table I. The column entitled "ΔS" is the volume of oil produced as a percent of pore volume. The column entitled Ratio is the value of the ratio: weight of excess base component/weight of sulfonate. The product obtained from the NALKYLENE 500 detergent alkylate was employed in runs 1 and 2 of the following Table I.

TABLE I

| Run No. | Ratio | % SXS[1] | % Sodium Sulfonate | Wt. % NaOH | ΔS (% of Pore Volume) |
|---|---|---|---|---|---|
| 1 | 0.48 | 6.4 | 8.4 | 4.0 | 6.9 |
| 2 | 2.35 | 6.0 | 1.7 | 4.0 | 5.0 |

[1]SXS is sodium xylene sulfonate.

This example demonstrates use of the overbased alkylaromatic sulfonates of the instant invention to promote tertiary oil recovery.

EXAMPLE 3

The procedure described in Example 1 was emloyed except for the following differences. The alkylation product recovered by the alkylation of benzene with chlorinated alkane was fractionally distilled to produce a product boiling in the range of about 179°C at 10 mm mercury pressure to about 246°C at 10 mm mercury pressure. This distillate fraction, a so-called diphenylalkane fraction, was then sulfonated by contacting with 40grams of $SO_3$ per each 100 grams of diphenylalkane fraction of alkylation product at a temperature maintained at 55°C. The sulfonation products were then recovered as described in Example 1, neutralized with aqueous sodium hydroxide solution, as described in Example 1, and overbased with aqueous sodium hydroxide solution as indicated in the following Table II. Core tests as described in Example 1 were then carried out. The column entitled "ΔS" is the volume of oil produced as a percent of pore volume. Results as indicated in the following Table II were obtained.

TABLE II

| Run. No. | Molecular Weight of Diphenylalkane Alkylate Fraction | Wt. % Sulfonate | Wt. % NaOH | Wt. % Solubilizer | Ratio | ΔS |
|---|---|---|---|---|---|---|
| 5 | 305 | 7.9 | 4.8 | 0 | 0.61 | 6.9 |
| 6 | 305 | 9.0 | 4.0 | 6.0 | 0.51 | 7.4 |
| 7 (Control) | 305 | 15.0 | 0 | 0 | 0 | 4.2 |

* "Ratio" is the value of the ratio: "Weight of excess base component/weight of sulfonate".

This example demonstrates the use of the anionic waterflood additive of the instant invention. The data demonstrate that an aqueous mixture of sulfonate obtained from a distillate fraction which is overbased according to the invention gives a tertiary oil recovery of about 6.9 in comparison to the same composition but without overbasing which yields an oil recovery of only about 4.2.

EXAMPLE 4

Runs very similar to those described in Example 1 were carried out, but with the following differences:

The alkylate product which was employed was a high molecular weight byproduct fraction from the NALKYLENE detergent alkylate process. The chlorinated normal alkane employed for alkylation was the same as in Example 1 and benzene was the material alkylated. A bottoms fraction from the distillation was the alkylate product employed. This so-called NALKYLENE bottoms fraction employed had a typical composition as follows:

| | |
|---|---|
| Monoalkylbenzene (246–275 MW) | 10% |
| Dialkylbenzene (358–470 MW) | 40% |
| Diphenylalkanes (296–366 MW) | 40% |
| Alkylated Tetrahydronaphthalenes (some 246–275 MW, some 358–470 MW) | 10% |

The NALKYLENE bottoms alkylate product was sulfonated with sulfur trioxide and converted to the corresponding sodium salt as described in Example 1. The product had an average equivalent weight of 350–400. The core runs were conducted as in Example 3 except that initial saturation was with Blandol mineral oil product (a highly refined mineral oil product similar to the 80 pale oil) rather than with the 80 pale oil.

Runs were made by injecting a 2 percent pore volume of the aqueous mixture to be tested followed by a 10 percent pore volume slug of 1 percent sodium chloride brine followed by a 2 percent pore volume slug of 4 weight percent sodium hydroxide solutin followed by 1.5 pore volumes of 1 percent sodium chloride brine.

The sulfonated product employed in the runs was prepared by charging the NALKYLENE bottoms alkylate product to a reactor and then passing vaporized sulfur dioxide-air (about 5 weight percent sulfur dioxide in the air) through the bottoms product in the reactor. Temperature was controlled at about 50°–55°C. The SO₃-air mixture was passed through the alkylate product for about 30 minutes until about 0.27 gram SO₃ per gram of alkylate had been introduced. The resulting sulfonic acid mixture was neutralized by adding to a stirred solution of about 10 weight percent sodium hydroxide in water to a pH 8–9 end point. Analysis of the sulfonate product was as follows:

| | |
|---|---|
| % Active Sulfonate | 36.2 |
| % Nonsulfonate Oil | 13.7 |
| % Sodium Sulfate | 1.7 |
| % H₂O | 48.4 |
| Average Equivalent Weight as Sodium Salt | 385 |

The sulfonate thus prepared was employed in run 8 as presented in the following, Table III.

In run 9 of the following Table III, a blend of a sulfonate prepared from the NALKYLENE alkylate bottoms plus a high molecular weight natural mahogany sulfonate derived from a petroleum fraction having an average equivalent weight of 550 was employed. Data are presented in Table III.

TABLE III

| Run No. | Sulfonate | Wt. % Sulfonate | Wt. % NaOH | Ratio | ΔS |
|---|---|---|---|---|---|
| 8 | Alkylate Sulfonate | 6.7 | 4 | 0.6 | 12.3 |
| 9 | Alkylate Sulfonate Plus Mahogany Sulfonate | 4.87 1.88 | 4 | 0.6 | 12.1 |

These runs demonstrate use of an overbased sulfonate derived from an alkylation product of the instant invention to increase recovery of oil. The runs further demonstrate that a mixture of such overbased alkylate sulfonate plus overbased natural mahogany sulfonates are also highly effective to improve recovery of oil.

We claim:
1. A process for recovering hydrocarbons from a petroliferous formation which comprises:
   d. injecting into the formation an effective amount of an aqueous mixture which contains about 0.5 to about 25 weight percent of an overbased waterflood additive;
   the waterflood additive comprising a base component plus a normal alkylaromatic sulfonate;
   wherein the waterflood additive is sufficiently overbased that the ratio: weight of excess base component/weight of sulfonate is about 0.20 to about 1.0;
   wherein the base component is sodium hydroxide; and
   wherein the normal alkylaromatic sulfonate is a sulfonate having been prepared by partially chlorinating a normal alkane having about 10 to about 18 carbon atoms to about 2 to about 15 weight percent chlorine content, employing the chlorinated alkane to alkylate to aromatic hydrocarbon, sulfonating the thus formed alkylate to form a sulfonic acid, and converting the sulfonic acid to a sulfonate by reacting with the base component; and
   e. recovering the displaced hydrocarbons from the formation.

2. The process of claim 1 wherein the normal alkane is chlorinated to a chlorine content of about 3 to about 6 weight percent chlorine; wherein the aromatic hydrocarbon is represented by the following formula:

wherein Ar is a benzene or naphthalene ring having a valence of n, wherein R' is methyl or ethyl, and wherein n is 0, 1, or 2; and wherein about 1 to about 25 moles of the aromatic hydrocarbon per mole of chloroalkane are employed.

3. The process of claim 2 which includes the step of injecting into the formation subsequent to the waterflood additive, an additional amount of about 10 to about 1000 volume percent, based on the amount of the aqueous mixture (containing the normal alkylaromatic sulfonate plus the base component), of additional aqueous mixture of base component, the additional aqueous mixture of base component containing about 0.5 to 50 weight percent of base component.

4. The process of claim 3, wherein the aromatic hydrocarbon is benzene, and wherein about 5 to about 10 moles of benzene per mole of chloroalkane are employed.

5. The process of claim 2 which includes the steps of forming the overbased waterflood additive in situ in the petroliferous formation by the sequential steps of:
   f. injecting into the formation an effective amount of an aqueous mixture containing about 0.5 to about 25 weight percent of the normal alkylaromatic sulfonate component of the waterflood additive; and
   g. injecting into the formation an aqueous mixture containing a sufficient amount of base component such that the ratio of the total materials injected is about 0.20 to about 1.0.

6. The process of claim 2 which includes the steps of forming the overbased anionic waterflood additive in situ in the petroliferous formation by the sequential steps of:
   h. injecting into the formation an effective amount of an aqueous mixture containing about 0.5 to about 25 weight percent of the normal alkylaromatic sulfonate; and
   i. injecting into the formation an aqueous mixture containing a sufficient amount of base component such that the ratio of the total materials injected is about 0.20 to about 1.0.

7. The process of claim 6 wherein the aromatic hydrocarbon is benzene, and wherein about 5 to about 10 moles of benzene per mole of chloroalkane are employed in the alkylation reaction to form the alkylate from which the sulfonate is derived.

8. The process of claim 2 wherein the sulfonate is derived from the bottoms fraction remaining after the alkylate has been distilled to remove volatiles therefrom at a temperature range of about 180°C to about 240°C at 10 mm mercury pressure.

9. The process of claim 2 wherein the sulfonate is derived from a bottoms fraction of an alkylate wherein the alkyl component of the alkylate is derived from a mixture of $C_{10}$–$C_{12}$ normal alkanes and the bottoms fraction is that portion remaining after fractional distillation of the alkylate at a temperature of up to about 200°C at 10 mm mercury pressure.

10. The process of claim 2 wherein the sulfonate is derived from a bottoms fraction of an alkylate product wherein the alkyl component of the alkylate is derived from a mixture of $C_{12}$–$C_{14}$ normal alkanes and wherein the bottoms fraction is that portion remaining after fractional distillation at a temperature of about 210°C to about 215°C at 10 mm mercury pressure.

11. The process of claim 2 wherein the sulfonate is derived from a distillation cut of the alkylate, such distillation cut having a boiling range of about 180°C to about 280° at 10 mm mercury pressure.

12. The process of claim 2 wherein the sulfonate is derived from an alkylate, the alkylate having been prepared by a process wherein a separated distillate fraction of the alkylate product is recycled to the alkylation reaction when the alkylation process is done in a continuous manner or is recycled to a subsequent batch when the alkylation reaction is done in a batchwise manner.

13. The process of claim 2 wherein the sulfonate is derived from NALKYLENE 500 detergent alkylate product, which is principally a linear monoalkylbenzene containing $C_{10}$–$C_{12}$ carbon side chains and having an average molecular weight of about 237–238.

14. The process of claim 2 wherein the sulfonate is derived from an alkylate distillation product boiling in the range of about 190°C to about 246°C at 10 mm mercury pressure, wherein said alkylation product is derived from a normal alkane mixture having about 10 to about 12 carbon atoms per molecule.

* * * * *

UNITED STATES PATENT OFFICE
CERTIFICATE OF CORRECTION

PATENT NO. : 3,965,984

DATED : June 29, 1976

INVENTOR(S) : Charles R. Clark, M. Duane Gregory, Oliver C. Kerfoot Delmar D. Krehbiel and Carl D. Kennedy It is certified that error appears in the above-identified patent and that said Letters Patent are hereby corrected as shown below:

Column 3, line 6, "addition" should read -- adduction -- .

Column 9, line 62, in Table I, the Run No. "1" has been left out.

Column 11, line 5, "solutin" should be -- solution -- .

Column 12, line 2 "to alkylate to" should read -- to alkylate an --.

Signed and Sealed this

Thirtieth Day of November 1976

[SEAL]

Attest:

RUTH C. MASON
Attesting Officer

C. MARSHALL DANN
Commissioner of Patents and Trademarks